(12) United States Patent
Beato

(10) Patent No.: US 9,307,107 B2
(45) Date of Patent: Apr. 5, 2016

(54) CLASSIFICATION OF SCANNED HARDCOPY MEDIA

(71) Applicant: KODAK ALARIS INC., Rochester, NY (US)

(72) Inventor: Louis James Beato, Rochester, NY (US)

(73) Assignee: Kodak Alaris Inc., Rochester, NY (US)

( * ) Notice: Subject to any disclaimer, the term of this patent is extended or adjusted under 35 U.S.C. 154(b) by 0 days.

(21) Appl. No.: 13/908,034

(22) Filed: Jun. 3, 2013

(65) Prior Publication Data

US 2014/0355073 A1 Dec. 4, 2014

(51) Int. Cl.
| | |
|---|---|
| *H04N 1/00* | (2006.01) |
| *G06K 9/00* | (2006.01) |
| *H04N 1/40* | (2006.01) |
| *H04N 1/32* | (2006.01) |

(52) U.S. Cl.
CPC ........ *H04N 1/00708* (2013.01); *G06K 9/00456* (2013.01); *H04N 1/00734* (2013.01); *H04N 1/00782* (2013.01); *H04N 1/32117* (2013.01); *H04N 1/40062* (2013.01); *H04N 2201/3243* (2013.01)

(58) Field of Classification Search
CPC .......... G06K 9/00456; H04N 1/00708; H04N 1/00801; H04N 1/00806; H04N 1/40062; H04N 2201/3243; H04N 1/00734; H04N 1/00782; H04N 1/32117
USPC .................................. 358/449, 1.1
See application file for complete search history.

(56) References Cited

U.S. PATENT DOCUMENTS

| | | |
|---|---|---|
| 5,953,450 A | 9/1999 | Kanamori |
| 6,745,186 B1 | 6/2004 | Testa et al. |
| 7,039,856 B2 | 5/2006 | Peairs et al. |
| 7,920,296 B2 | 4/2011 | Beato et al. |
| 2003/0021471 A1 | 1/2003 | Said |
| 2003/0099379 A1* | 5/2003 | Monk et al. ................... 382/115 |
| 2006/0017959 A1 | 1/2006 | Downer et al. |
| 2006/0198559 A1 | 9/2006 | Manico et al. |
| 2007/0250532 A1 | 10/2007 | Beato et al. |
| 2009/0067729 A1 | 3/2009 | Turkelson et al. |
| 2011/0058231 A1 | 3/2011 | Oshima |
| 2011/0292441 A1* | 12/2011 | Kobako et al. ............... 358/1.15 |
| 2012/0120432 A1* | 5/2012 | Hirohata et al. ............. 358/1.13 |
| 2012/0176634 A1 | 7/2012 | Sano |
| 2012/0307316 A1 | 12/2012 | De Muelenaere et al. |
| 2013/0325756 A1* | 12/2013 | He et al. ......................... 706/12 |

FOREIGN PATENT DOCUMENTS

JP 2010-273119 A 12/2010

OTHER PUBLICATIONS

Manning et al., Foundations of Statistical Natural Language Processing, MIT Press, Cambridge, MA, Chapter 16, pp. 575-608 (1999).
International Search Report and Written Opinion dated Nov. 7, 2014 in corresponding PCT application No. PCT/US2014/040476.

* cited by examiner

*Primary Examiner* — Iriana Cruz
(74) *Attorney, Agent, or Firm* — Hogan Lovells US LLP

(57) ABSTRACT

A method for automatically classifying scanned hardcopy media based on its physical size. The hardcopy media is classified as a photograph if the determined physical size matches a common physical sizes for photographs to within a predetermined tolerance, and is classified as a document if the determined physical size matches one of the common physical sizes for documents to within a predetermined tolerance. Otherwise, a media classification is determined using contextual processing.

16 Claims, 8 Drawing Sheets

245

500

COMMON ISO DOCUMENT SIZES

| FORMAT | A SERIES | | B SERIES | | C SERIES | |
|---|---|---|---|---|---|---|
| | SIZE (mm) | SIZE (inches) | SIZE (mm) | SIZE (inches) | SIZE (mm) | SIZE (inches) |
| 0 | 841×1189 | 33.11×46.81 | 1000×1414 | 39.37×55.67 | 917×1297 | 36.10×51.06 |
| 1 | 594×841 | 23.39×33.11 | 707×1000 | 27.83×39.37 | 648×917 | 25.51×36.10 |
| 2 | 420×594 | 16.54×23.39 | 500×707 | 19.69×27.83 | 458×648 | 18.03×25.51 |
| 3 | 297×420 | 11.69×16.54 | 353×500 | 13.90×19.69 | 324×458 | 12.76×18.03 |
| 4 | 210×297 | 8.27×11.69 | 250×353 | 9.84×13.90 | 229×324 | 9.02×12.76 |
| 5 | 148×210 | 5.83×8.27 | 176×250 | 6.93×9.84 | 162×229 | 6.38×9.02 |
| 6 | 105×148 | 4.13×5.83 | 125×176 | 4.92×6.93 | 114×162 | 4.49×6.38 |
| 7 | 74×105 | 2.91×4.13 | 88×125 | 3.46×4.92 | 81×114 | 3.19×4.49 |
| 8 | 52×74 | 2.05×2.91 | 62×88 | 2.44×3.46 | 57×81 | 2.24×3.19 |
| 9 | 37×52 | 1.46×2.05 | 44×62 | 1.73×2.44 | 40×57 | 1.57×2.24 |
| 10 | 26×37 | 1.02×1.46 | 31×44 | 1.22×1.73 | 28×40 | 1.10×1.57 |

| FORMAT | B SERIES | | SHIROKU BAN | | KIKU | |
|---|---|---|---|---|---|---|
| | SIZE (mm) | SIZE (inches) | SIZE (mm) | SIZE (inches) | SIZE (mm) | SIZE (inches) |
| 0 | 1030×1456 | 40.55×57.32 | | | | |
| 1 | 728×1030 | 28.66×40.55 | | | | |
| 2 | 515×728 | 20.28×28.66 | | | | |
| 3 | 364×515 | 14.33×20.28 | | | | |
| 4 | 257×364 | 10.12×14.33 | 264×379 | 10.39×14.92 | 227×306 | 8.94×12.05 |
| 5 | 182×257 | 7.17×10.12 | 189×262 | 7.44×10.31 | 151×227 | 5.94×8.94 |
| 6 | 128×182 | 5.04×7.17 | 127×188 | 5.00×7.40 | | |
| 7 | 91×128 | 3.58×5.04 | | | | |
| 8 | 64×91 | 2.52×3.58 | | | | |
| 9 | 45×64 | 1.77×2.52 | | | | |
| 10 | 32×45 | 1.26×1.77 | | | | |
| 11 | 22×32 | 0.87×1.26 | | | | |
| 12 | 16×22 | 0.63×0.87 | | | | |
| 0 | 1030×1456 | 40.55×57.32 | | | | |

COMMON JAPANESE DOCUMENT SIZES

*FIG. 4B*

COMMON NORTH AMERICAN DOCUMENT SIZES

| FORMAT | SIZE (inches) | SIZE (mm) | SIMILAR CANADIAN P-SIZE |
|---|---|---|---|
| LETTER | 8.5×11 | 215.9×279.4 | P4: 215×280 |
| GOVERNMENT-LETTER | 8.0×10.5 | 203.2×266.7 | |
| LEGAL | 8.5×14 | 215.9×355.6 | |
| JUNIOR LEGAL | 8.0×5.0 | 203.2×127 | |
| LEDGER | 17×11 | 432×279 | |
| TABLOID | 11×17 | 279×432 | |

COMMON ANSI DOCUMENT SIZES

| FORMAT | SIZE (inches) | SIZE (mm) | ASPECT RATIO | ALIAS | SIMILAR ISO A-SIZE |
|---|---|---|---|---|---|
| ANSI A | 8.5×11 | 216×279 | 1.2941 | LETTER | A4 |
| ANSI B | 17×11<br>11×17 | 432×279<br>279×432 | 1.5455 | LEDGER<br>TABLOID | A3 |
| ANSI C | 17×22 | 432×559 | 1.2941 | | A2 |
| ANSI D | 22×34 | 559×864 | 1.5455 | | A1 |
| ANSI E | 34×44 | 864×1118 | 1.2941 | | A0 |

*FIG. 4C*

| WORD STEM | PROBABILITY |
|---|---|
| INVOIC: | 0.95 |
| TOTAL: | 0.85 |
| DATE: | 0.8 |
| AMOUNT: | 0.6 |
| CHARG: | 0.5 |
| PAYMENT: | 0.5 |
| UNIT: | 0.5 |
| DESCRIPT: | 0.5 |
| SERVIC: | 0.45 |
| PRICE: | 0.45 |
| BILL: | 0.45 |
| QUANTITI: | 0.4 |
| SALE: | 0.4 |
| ACCOUNT: | 0.35 |
| SHIP: | 0.35 |
| ADDRESS: | 0.35 |
| NAME: | 0.35 |
| COMPANI: | 0.35 |
| CUSTOM: | 0.3 |
| STREET: | 0.3 |
| INCLUD: | 0.25 |
| PLEAS: | 0.25 |
| PAGE: | 0.25 |

*FIG. 6*

CLASSIFICATION OF SCANNED HARDCOPY MEDIA

FIELD OF THE INVENTION

This invention pertains to the field of digital imaging, and more particularly to categorizing scanned images based upon physical size and content.

BACKGROUND OF THE INVENTION

In the field of intelligent document understanding, one of the basic first steps is to identify what kind of object has been scanned. At a high level, most objects can be classified as either a photograph or a document. A document containing a photograph would also typically be classified as a document as long as there was text somewhere else on the page. It would be advantageous as a first step to separate the documents from the photographs. By doing so, image processing methods and algorithms that are tuned to the image type can be employed to maximize the image quality. Another reason to separate photographs and documents is to enable using different compression schemes to optimize storage and transmission time. Compression schemes vary greatly for photographs where lossy compression can usually be tolerated. Documents are typically compressed using a lossless method to preserve image and text clarity for further use in optical character recognition (OCR).

Methods of document classification typically rely on lexical features of a document. In Chapter 16 of the book entitled "Foundations of statistical natural language processing" (MIT Press, Cambridge, Mass., 1999), authors Manning and Schutze provide a comprehensive review of classification procedures for text documents. The described methods, including: decision trees, maximum entropy models, perceptrons, and k-nearest neighbor classification, rely on the analysis of contextual features within the document. Such analysis can be time consuming and is not applicable for analyzing documents that do not contain text.

U.S. Pat. No. 7,920,296 to Beato et al., entitled "Automatic determining image and non-image sides of scanned hardcopy media," describes a method for separating a photographic image from its non-image side based on spatial frequency characteristics. One method of characterizing the spatial frequency characteristics is by calculating the compression factor of the scanned digital image. It is well known that scanned digital images with high frequency content (such as photographs) will not compress as well as a scanned digital image with large areas of low frequency content (such as many documents). While this approach could be used in a simple photograph and document classifier, it would not produce robust results. For example, documents with high densities of text would or embedded images would be classified incorrectly as photographs.

U.S. Patent Application Publication 2009/0067729 to Turkelson et al., entitled "Automatic document classification using lexical and physical features," describes a system that uses physical characteristics and lexical information to classify documents (e.g., as receipts or business cards). Examples of physical features that can be used for document classification include colorfulness, orientation, size, margin widths and horizontal and vertical projections. Lexical characteristics are determined by performing optical character recognition and performing textual analysis to determine a set of lexical features. A machine learning system is trained to discriminate between known types of documents in order based on the physical and lexical features.

U.S. Pat. No. 5,953,450 to Kanamori et al., entitled "Image forming apparatus correcting the density of image information according to the type of manuscript," describes a system that uses density histograms to set white and black points for reproduction. The density histograms are also used to distinguish between photograph and a text document.

U.S. Pat. No. 7,039,856 to Peairs et al., entitled "Automatic document classification using text and images," describes a system for automatic document classification based on textual content as well as visual appearance. A new document is automatically stored in one or more directories based on comparing the characteristics of the new document to those of documents that have been previously stored in the directories. This method will typically be slow, since each unknown document must be examined using textual analysis, which can be time consuming.

There remains a need for a robust and efficient method to automatically distinguish between photographs and documents.

SUMMARY OF THE INVENTION

The present invention represents a method for automatically classifying scanned hardcopy media, comprising:
  scanning a piece of hardcopy media using a digital image capture device to provide a scanned digital image having a plurality of image pixels having pixel values;
  determining a physical size of the piece of hardcopy media;
  receiving a common photo sizes database specifying common physical sizes for photographs;
  receiving a common document sizes database specifying common physical sizes for documents;
  classifying the scanned piece of hardcopy media as a photograph if the determined physical size matches one of the common physical sizes for photographs to within a predetermined tolerance;
  classifying the scanned piece of hardcopy media as a document if the determined physical size matches one of the common physical sizes for documents to within a predetermined tolerance; and
  storing an indication of the determined classification in a processor-accessible memory.

This invention has the advantage that the physical sizes of the documents are used to provide important clues about the appropriate document classification, thereby providing a document classification method that has an improved computational efficiency and accuracy.

It has the additional advantage that most documents can be classified using a simple table look-up operation, which is very fast relative to prior art methods that rely on textual analysis and machine learning processes.

BRIEF DESCRIPTION OF THE DRAWINGS

FIG. 4A shows a database of common ISO document sizes;

FIG. 4B shows a database of common Japanese document sizes;

FIG. 4C shows a database of common North American and ANSI document sizes;

FIG. 6 shows a portion of a database of common word stems obtained from a set of scanned invoice documents.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The phrase, "photograph" as used herein refers to any scanned photographic hardcopy digital image.

Figure 1:
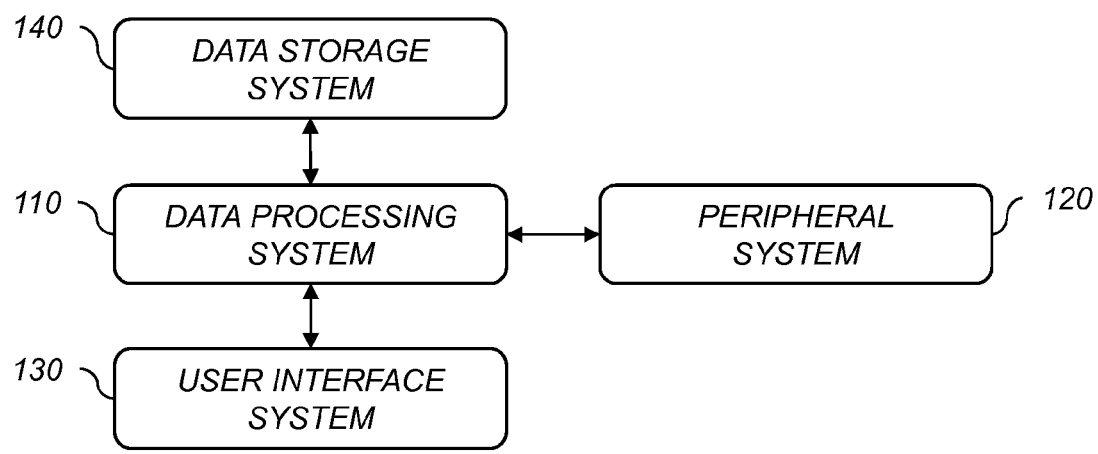
FIG. 1 is a high-level diagram showing the components of a system for classifying scanned hardcopy media according to an embodiment of the present invention.

FIG. 1 is a high-level diagram showing the components of a system for classifying scanned hardcopy media according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The inventors have recognized that physical page characteristics, specifically physical size, are useful for automatically and quickly classifying documents and photographs that have been placed in a document scanner into corresponding classifications. The method first compares the physical size of a scanned digital image against known common photograph sizes and known common document sizes and classifies the image accordingly when a match is found. In the event that the scanned digital image does not match one of the known common sizes, contextual processing is applied for further analysis. This approach represents a robust method for separating photographs and documents which provides a speed advantage relative to prior art methods that rely on textual processing and machine learning algorithms.

Figure 2:
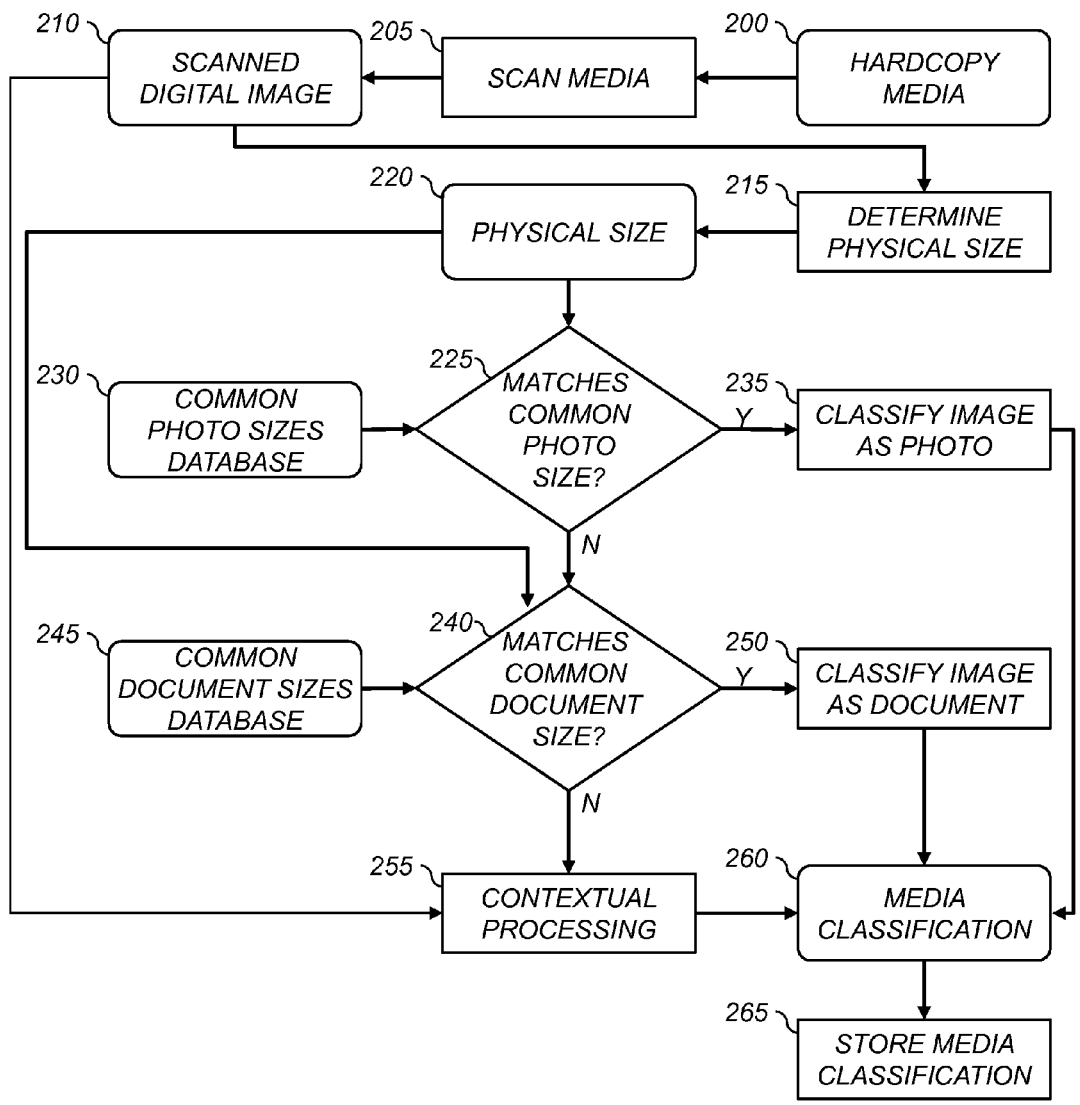
FIG. 2 is a flowchart showing a method of classifying scanned photographic prints and documents according to an exemplary embodiment.

FIG. 2 illustrates a flowchart for classifying scanned hardcopy media according to an embodiment of the present invention. The input to the method is a physical hardcopy media 200. A scan media step 205 is used to scan the hardcopy media 200 using a digital image capture device, thereby providing a scanned digital image 210. The digital scanner can be a hardcopy scanner or any other appropriate digital image capture device such as a digital camera or a mobile phone with a digital camera module. The scanned digital image 210 includes an array of image pixels having pixel values. For cases where the scanned digital image 210 is a color image, the image pixels will have pixel values for a plurality of color channels.

The scanned digital image 210 is then analyzed using a determine physical size step 215 to determine a physical size 220 of the hardcopy media 200. In a preferred embodiment, the physical size 220 is determined by using data processing system 110 (FIG. 1) to automatically analyze the pixels of the scanned digital image 210 to identify a region of the scanned digital image 210 that corresponds to the scanned hardcopy media 200. Methods for identifying this region are well-known in the art, and generally involve detecting the edges of the scanned hardcopy media 200 or detecting image pixels that differ significantly from a known background. The number of pixels in the horizontal and the vertical dimensions of the identified region are then converted to physical dimension by scaling them by the scanner resolution, which is typically measured in dots-per-inch (dpi). For example, the horizontal physical size (e.g., in inches) can be computed by dividing the horizontal region size (in pixels) by the horizontal resolution (e.g., in dpi). Likewise, the vertical physical size can be computed by dividing the vertical region size by the vertical resolution. The physical size 220 can be represented in any appropriate physical units such as inches or mm.

In an alternate embodiment, the determine physical size step 215 can determine the physical size 220 of the hardcopy media 200 using appropriate sensors in the hardcopy scanner. Any kind of sensor known in the art can be used including mechanical sensors, optical sensors or electrical sensors.

A common photo size test 225 is used to compare the determined physical size 220 to a set of common photo sizes stored in a common photo sizes database 230 to determine whether the hardcopy media 200 should be classified as a photograph. The common photo sizes database 230 contains the physical size dimensions for a set of common photographic sizes.

Figure 3:
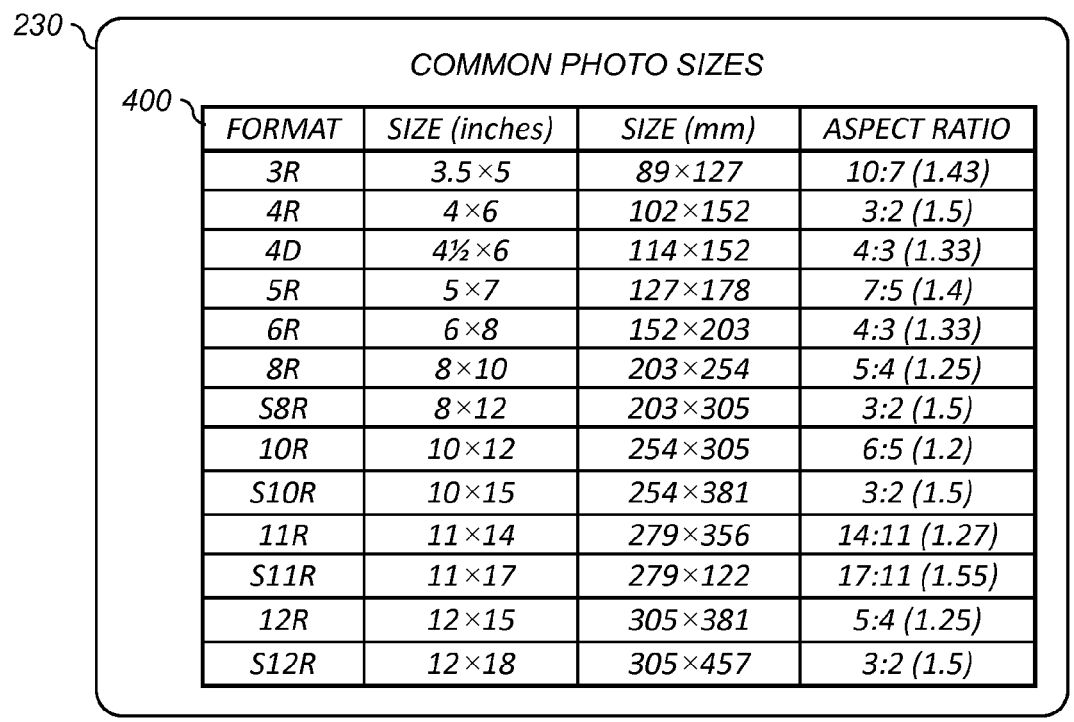
FIG. 3 shows a database of common photo sizes.

Standard photographic print sizes are generally used in photographic printing. Cut sheets of paper meant for printing photographs are commonly sold in these sizes. FIG. 3 shows an exemplary common photo sizes database 230 that includes a table of common photo sizes 400 that have been used by the photographic industry in recent years. The table of common photo sizes 400 is in a priority order with the most common sizes listed first in the table. The sizes are often denoted with a code of the format "nR", where the number n represents the length of the shorter edge in inches. For example, the size of a "4R" photograph is 4×6 inch, and the size of an "8R" photograph is 8×10 inch. In the normal series, the long edge is typically equal to the length of the short edge plus 2 inches (10 inches or less) or 3 inches (11 inches and above). The alternative Super series, denoted "SnR", has an aspect ratio of 3:2 (or as close as possible) and thus provides a better fit for standard 135 film (35 mm) at sizes of 8 inches and above.

The table of common photo sizes 400 includes a number of columns showing the sizes in both inches and mm, as well as the aspect ratio for each of the formats. It will be recognized by one skilled in the art that the information in the various columns is redundant, and that the common photo sizes database 230 would only need to store the physical sizes in terms of some appropriate unit (e.g., inches).

The exemplary common photo sizes database 230 includes most of the standard photo sizes that have been used by the photographic industry in the U.S. during the last 40 years. In some embodiments, the common photo sizes database 230 can also include other less common photo sizes (e.g., photo sizes corresponding to historical photo formats), or photo sizes corresponding to standard photo formats that are used in other countries. For example, in Japan, the "L" format is equivalent to "3R" format, while the "2L" format (twice the size) is equivalent to the "5R" format. "KG" represents the size of a traditional 4×6 inch (4R) Japanese postcard. The "nP" or cut series are defined in reference to a full page size of 457×560 mm, with smaller numbers (fewer cuts) indicating larger sizes. Unlike ISO 216 paper sizes, the aspect ratios of photographic prints vary, so exact scaling of prints is not always possible. Many of the standard sizes are the same as sheet film formats, and are appropriate for making contact sheets from these films. New photo size formats can be added to the common photo sizes database 230 at any time in accordance with the population of photographs that are commonly scanned in a particular environment.

In a preferred embodiment, the common photo size test 225 sequentially compares the determined physical size 220 to the physical sizes stored in the common photo sizes database 230. If the determined physical size 220 is found to match one of the common physical sizes to within a predetermined tolerance (e.g., ±2%), then the hardcopy media 200 can be assumed to be a photograph, and a classify image as photo step 235 is used to assign a media classification 260 of "photograph". If a physical size 220 is found to match one of the photo sizes in the common photo sizes database 230, then for computational efficiency it is unnecessary to compare the physical size 220 to any other untested photo sizes in the common photo sizes database 230. For this reason, it is advantageous to organize the common photo sizes database 230 so that the most common photo sizes are tested first.

If the common photo size test 225 determines that the determined physical size 220 does not match any of the common photo sizes in the common photo sizes database 230, then the process proceeds to a common document size test 240. The common document size test 240 is used to compare the determined physical size 220 to a set of common document sizes stored in a common document sizes database 245 to determine whether the hardcopy media 200 should be classified as a photograph. The common document sizes database 245 contains the physical size dimensions for a set of common document sizes.

In a preferred embodiment, the common document size test 240 sequentially compares the determined physical size 220 to the physical sizes stored in the common document sizes database 245. If the determined physical size 220 is found to match one of the common document sizes to within a predetermined tolerance (e.g., ±2%), then the hardcopy media 200 can be assumed to be a document, and a classify image as document step 250 is used to assign a media classification 260 of "document". If a physical size 220 is found to match one of the document sizes in the common document sizes database 245, then for computational efficiency it is unnecessary to compare the physical size 220 to any other untested document sizes in the common document sizes database 245. For this reason, it is advantageous to organize the common document sizes database 245 so that the most common document sizes are tested first.

Standard document sizes are generally used in many document printing applications. Cut sheets of paper meant for printing documents are commonly sold in these sizes. Many paper size standards conventions have existed at different times and in different countries. Today there is one widespread international ISO standard (including A4, B3, C4, etc.) and a local standard used in North America (including letter, legal, ledger, etc.). The standard paper sizes are used for writing paper, stationery, cards, and some printed documents. The standards also have related sizes for envelopes. The international paper size standard, ISO 216, is based on the German DIN 476 standard for paper sizes. ISO paper sizes are all based on a single aspect ratio of $\sqrt{2}$, or approximately 1:1.4142.

FIG. 4A shows a portion of an exemplary common document sizes database 245 that includes document sizes specified by a table of common ISO document sizes 500. The standard document sizes are arranged in three series: an A series, a B series and a C series. The base A0 size of paper is defined to have an area of 1 m2. Rounded to millimeters, the A0 paper size is 841 mm×1189 mm (33.1 in×46.8 in). Successive paper sizes in the series A1, A2, A3, and so forth, are defined by halving the preceding paper size along the larger dimension. The most frequently used paper size is A4 measuring 210 mm×297 mm (8.3 in×11.7 in).

A significant advantage of this ISO system is its scaling: if a sheet with an aspect ratio of $\sqrt{2}$ is divided into two equal halves parallel to its shortest sides, then the halves will again have an aspect ratio of $\sqrt{2}$. Folded brochures of any size can be made by using sheets of the next larger size (e.g., A4 sheets are folded to make A5 brochures). The system allows scaling without compromising the aspect ratio from one size to another—as provided by office photocopiers (e.g., enlarging A4 to A3 or reducing A3 to A4). Similarly, two sheets of A4 can be scaled down and fit on exactly 1 sheet without any cutoff or margins. With the ISO system, weights are easy to calculate as well: a standard A4 sheet made from 80 grams/m2 paper weighs 5 grams (as it is one 16th of an A0 page, measuring 1 m2), allowing one to easily compute the weight—and associated postage rate—by counting the number of sheets used.

In addition to the A series, there is a less common B series. The area of B series sheets is the geometric mean of successive A series sheets. So, B1 is between A0 and A1 in size, with an area of 0.707 m2 ($\sqrt{1/2}$ m2). As a result, B0 is 1 meter wide, and other sizes in the B series are a half, a quarter or further fractions of a meter wide. While less common in office use, it is used for a variety of special situations. Many posters use B-series paper or a close approximation, such as 50 cm×70 cm; B5 is a relatively common choice for books. The B series is also used for envelopes and passports. The B-series is widely used in the printing industry to describe both paper sizes and printing press sizes, including digital presses. B3 paper is used to print two US letter or A4 pages side by side using imposition. Similarly, four pages would be printed on B2 and eight on B1.

FIG. 4B shows a portion of an exemplary common document sizes database 245 that includes document sizes given in a table of common Japanese document Sizes 510. Japanese standards define two main series of paper sizes. The JIS A-series (not shown in FIG. 4B) is identical to the ISO A-series (see FIG. 4A), but with slightly different tolerances. The area of Japanese B-series paper is 1.5 times that of the corresponding A-paper (instead of the factor of $\sqrt{2}$ for the ISO B-series), so the length ratio is approximately 1.22 times the length of the corresponding A-series paper. The aspect ratio of the paper is the same as for A-series paper. Both A- and B-series paper is widely available in Japan, Taiwan and China, and most photocopiers are loaded with at least A4 and either one of A3, B4 and B5 paper.

There are also a number of traditional Japanese paper sizes that are now mostly used only by printers. The most common of these old series are the Shiroku-ban and the Kiku paper sizes, which are shown in the table of common Japanese document sizes 510 of FIG. 4B FIG. 4C shows a portion of an exemplary common document sizes database 245 that includes document sizes given in a table of common North American document sizes 520 and a table of common ANSI document sizes 530. Standard document sizes in North America use a different system of imperial paper sizes compared to the rest of the world. The current standard sizes are unique to that continent (though with globalization other parts of the world have become increasingly familiar with them). "Letter", "legal", "ledger", and "tabloid" are by far the most commonly used of these for everyday activities. The origins of the exact dimensions of "letter" size paper (8.5×11 inch) are lost in tradition and not well documented. Outside of North America, Letter size is also known as "American Quarto" and the size is indeed almost exactly a quarter of the old Imperial (British) paper size known as Demy 4to (17.5×22.5 inch), allowing 0.5 inch for trimming.

The table of common ANSI document sizes 530 in FIG. 4C shows a set of document sizes that were adopted by the American National Standards Institute in 1996. These document sizes were specified ANSI/ASME Y14.1, which defined a regular series of paper sizes based upon the de facto standard 8.5×11 inch "letter" size, which it assigned "ANSI A". This series also includes the "ledger" and "tabloid" sizes which are referred to as "ANSI B". This series is somewhat similar to the ISO standard in that cutting a sheet in half would produce two sheets of the next smaller size. Unlike the ISO standard, however, the arbitrary aspect ratio forces this series to have two alternating aspect ratios. To wit, "letter" (ANSI A) is less elongated than A4, while "ledger/tabloid" (ANSI B) is more elongated than A3.

In some embodiments, the common document sizes database 245 can include all of the standard document sizes shown in FIGS. 4A-4C. In other embodiments, only those document sizes that are common to a particular geographical region or a particular application can be included. In some applications, there may be certain non-standard document sizes that are commonly encountered (e.g., standard receipt sizes) that do not correspond to any of the standard document sizes discussed above. In this case, these non-standard document sizes can also be included in the common document sizes database 245.

In some embodiments, if the common document size test 240 determines that the hardcopy media 200 should be classified as a document, additional optional processing can be used to determine a document type. For example, the presence and distribution of colors and alphanumeric characters in the document can be analyzed to classify the document into various document classifications such as a text document classification, a line-art document classification or a graphics document classification. Any method known in the art for determining such document classifications can be used in accordance with the present invention. For example, in some embodiments, the method described in U.S. Patent Application Publication No. 2003/0021471 to Said, entitled "Classification of features in compound documents," which is incorporated herein by reference, can be used to determine appropriate document classifications.

If the common document size test 240 determines that the determined physical size 220 does not match any of the common photo sizes in the common photo sizes database 230, then the process proceeds to a contextual processing step 255 for further analysis in order to determine the media classification 260 using contextual information. Any appropriate contextual processing method known in the art can be used in accordance with the present invention.

In some embodiments, the scanned digital image 210 is analyzed to detect the presence of any alphanumeric characters present in the hardcopy media 200, and the hardcopy media 200 is classified as a document if the detected alphanumeric characters satisfy a predefined criterion. An example of a simple predefined criterion that can be used in accordance with the present invention is to count the total number of recognized alphanumeric characters and compare the determined number of characters to a predefined threshold. If the determined number of characters is greater than or equal to the predefined threshold, the hardcopy media 200 is classified as a document, otherwise it is classified as a photograph. While photographs may include a small number of characters (e.g., on signs or T-shirts included in the photograph), a large number of characters would be indicative that the hardcopy media 200 is a document. In other embodiments, the predefined criterion can take into account other textual features such as the locations and patterns of the detected characters, or the words formed by the detected characters. For example, groups of recognized alphanumeric characters can be compared to a dictionary to identify recognized words. The number of recognized words can then be compared to a predefined threshold to determine whether the hardcopy media 200 should be classified as a document. In some embodiments, the number of recognized words is limited to words having a minimum number of characters (e.g., 3). A particular exemplary embodiment of the contextual processing step 255 will be discussed below with respect to FIG. 5.

A store media classification step 265 is used to store the determined media classification 260 in a processor-accessible memory (e.g., in a RAM). In some embodiments, the determined media classification 260 can be stored as metadata in association with a digital file used to store the scanned digital image 210.

While the method discussed with respect to FIG. 2 describes two media classifications, a photo classification and a document classification, it will be obvious to one skilled in the art that the method could be expanded to include additional media classifications as well. For example, a blank page media classification can be assigned when it is determined that the scanned digital image 210 is a blank white image (e.g, an image where all of the pixel values exceed a predefined threshold). In some embodiments, scanned digital images 210 that are determined to be blank pages are discarded rather than saving them in a digital file.

In some embodiments, the determined media classification 260 can be used to control or select one or more image processing operations that are applied to the scanned digital image 210. For example, different tone/color processing operations, different noise reduction operations, different image sharpening operations, or different image compression operations, or different parameters for controlling such image processing operations, can be selected responsive to the determined media classification 260. In this way, the performance of the image processing operations can be tuned to maximize the image quality or performance for the particular media classification 260. For example, a lossy compression algorithm can be selected for use with a "photo" media classification to provide an improved compression ratio without producing significant image quality losses, while a lossless compression algorithm can be selected for use with a "document" media classification to better preserve text clarity for further processing using an optical character recognition (OCR) algorithm.

Figure 5:
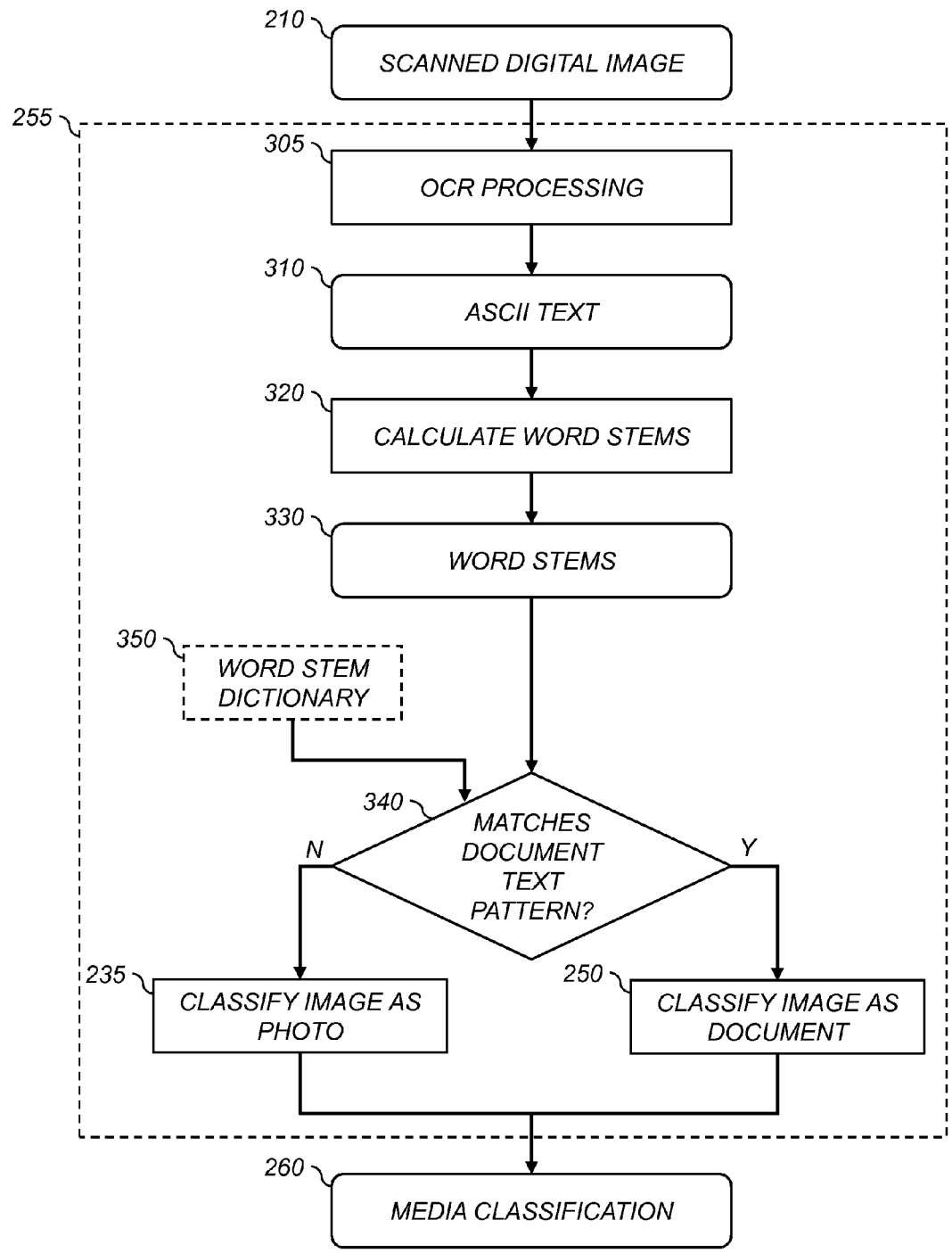
FIG. 5 is a flowchart showing additional details for the contextual processing step of FIG. 2 according to an exemplary embodiment.

FIG. 5 illustrates an exploded view of the contextual processing step 255 according to an exemplary embodiment. This step is used to determine a media classification 260 when the determined physical size 220 (FIG. 2) does not match one of the common photo sizes or common document sizes. The contextual processing begins with an OCR processing step 305 which applies optical character recognition (OCR) processing to the scanned digital image, thereby creating ASCII text 310. The OCR processing can be performed using any OCR algorithm known in the art. OCR algorithms are used to analyze a digital image and identify any alphanumeric characters contained therein. There are several OCR software packages available for no cost including Tesseract, GOCR, gnuOCR. There are also several commercial OCR software packages including Nuance, ABBYY, Iris, and others.

A calculate word stems step 320 is used to analyze the ASCII text 310 and determine a set of word stems 330. In linguistics, a word stem is just the base part of a word. For instance, the words: separate, separates, separating, separated, all have the same word stem "separat". This word stem will represent all the different variations of the tense, adverb, adjective, and the like of the word "separate".

The calculate word stems step 320 can use any stemming algorithm known in the art. In a preferred embodiment, the calculate word steps step 320 uses the well-known "Porter stemming algorithm" (or "Porter Stemmer") developed by M. F. Porter. The Porter stemming algorithm is a process for removing the more common morphological and inflexional endings from words in English. Its main use is as part of a term normalization process that is usually done when setting up information retrieval systems. The Porter Stemmer is based on the idea that the suffixes in the English language (approximately 1200) are mostly made up of a combination of smaller and simpler suffixes. This Porter stemming algorithm uses a five-step process, applying a set of rules for each step. Within each step, if a suffix rule is matched to a word, then the conditions attached to that rule are tested on what would be the resulting stem, if that suffix was removed in the way defined by the rule. For example such a condition may be, the number of vowel characters, which are followed be a consonant character in the stem (measure), must be greater than one for the rule to be applied.

The Porter Stemmer is widely available, and has been used in many applications. Implementations of this Stemmer are available at a website established by Porter himself, with implementations in Java, C and PERL; the website also includes documentation defining the Algorithm. Other implementations of this algorithm are available on the Internet. Porter's algorithm is probably most widely used stemming algorithm in Information Retrieval research.

A document text pattern test 340 is used to determine whether the set of determined word stems 330 found in the scanned digital image 210 matches the characteristics that would be expected of a document. In the simplest embodiment, the document text pattern test 340 compares the number of word steps 330 to a predefined threshold (e.g., 10) and executes the classify image as document step 250 to set the media classification 260 to "document" if the number of word steps 330 is greater than or equal to the predefined threshold.

Otherwise, the classify image as photo step 235 is executed to set the media classification 260 to "photo".

In other embodiments, the document text pattern test 340 can use more sophisticated analysis to determine whether the scanned digital image 210 is a document. For example, the word steps 330 can be compared to an optional word stem dictionary 350 that includes a database of word stems that commonly occur in documents. The number of word stems 330 that match entries in the word stem dictionary 350 can then be counted and compared to a predefined threshold. The word stem dictionary 350 can include word stems occurring in documents of a particular language, or can include word stems occurring in a set of relevant languages. In some embodiments, the word stem dictionary 350 can include only word stems that correspond to a particular document type of interest (e.g., invoices). FIG. 6 shows a portion of an exemplary word stem dictionary 350 for invoice documents in the English language. The displayed portion shows word stems that were found to occur in at least 25% of a sample population of invoice documents. Similar word stem dictionaries 350 can be provided for a set of different document types (e.g., receipts, business letters, reports, etc.). In this case, the word stems 330 found in the scanned digital image 210 can be compared to each of the word stem dictionaries 350 to determine not only whether the hardcopy media 200 (FIG. 2) is a document, but also to classify the type of document.

In some applications, both the front and back sides of the input hardcopy media 200 are scanned to provided corresponding scanned digital images 210. In this case, the method of the present invention can be applied independently to the scanned digital images 210 for both the front and back sides of the hardcopy media 200. In this way, independent media classifications 260 can be determined for each side. Alternately, the two sides can be analyzed in combination. For example, the physical sizes of the front and back sides will generally be identical, and therefore the common photo size test 225 and the common document size test 240 would both produce the same result. Therefore, if one of these tests produces a positive result for one side, the same classification could be assumed to the other side as well.

In some embodiments, where the double-sided hardcopy media is classified as a photograph, additional criteria can be used to determine which is the front side of the photograph and which is the back side of the photograph. For example, the method described in the aforementioned U.S. Pat. No. 7,920, 296 can be used for this purpose. In this case, it may be desirable to apply different processing to the front and back side of the photograph. For example, watermarks, back-printing and handwritten text written on the back side of the photograph can be analyzed to determine metadata that can be associated with the image depicted on the front side of the photograph. For example, U.S. Patent Application Publication No. 2007/0250532 to Beato, et al., entitled "Method for Automatically Generating a Dynamic Digital Metadata Record from Digitized Hardcopy Media," discloses automatically generating a dynamic set of metadata from digitized hardcopy media by analyzing features including watermarks and other physical print attributes to determine information about the print.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 hardcopy media
205 scan media step
210 scanned digital image
215 determine physical size step
220 physical size
225 common photo size test
230 common photo sizes database
235 classify image as photo step
240 common document size test
245 common document sizes database
250 classify image as document step
255 contextual processing step
260 media classification
265 store media classification step
305 OCR processing step
310 ASCII text
320 calculate word stems step
330 word stems
340 document text pattern test
350 word stem dictionary
400 table of common photo sizes
500 table of common ISO document sizes
510 table of common Japanese document sizes
520 table of common North American document sizes
530 table of common ANSI document sizes

The invention claimed is:

1. A method for automatically classifying scanned hardcopy media, comprising:
scanning a piece of hardcopy media using a digital image capture device to provide a scanned digital image having a plurality of image pixels having pixel values;
determining a physical size of the piece of hardcopy media;
receiving a common photo sizes database specifying common physical sizes for photographs;
receiving a common document sizes database specifying common physical sizes for documents;
classifying the scanned piece of hardcopy media as a photograph if the determined physical size matches one of the common physical sizes for photographs to within a predetermined tolerance;
classifying the scanned piece of hardcopy media as a document if the determined physical size matches one of the common physical sizes for documents to within a predetermined tolerance;
wherein if the determined physical size does not match any of the common physical sizes for photographs or any of the common physical sizes for documents to within a predetermined tolerance:
using a data processor to analyze the scanned digital image to detect the presence of any alphanumeric characters present in the piece of hardcopy media;

classifying the scanned piece of hardcopy media as a document if the detected alphanumeric characters satisfy a predefined criterion; and storing an indication of the determined classification in a processor-accessible memory.

2. The method of claim 1 wherein the physical size of the piece of hardcopy media is determined by using a data processor to analyze the pixel values of the scanned digital image.

3. The method of claim 1 wherein the physical size of the piece of hardcopy media is determined by using one or more sensors associated with the digital image capture device.

4. The method of claim 1 further including applying one or more digital image processing operations to the scanned digital image, wherein at least one of the digital image processing operations is controlled or selected responsive to the determined classification.

5. The method of claim 1 wherein the scanned piece of hardcopy media is analyzed using an optical character recognition algorithm to identify any alphanumeric characters present in the piece of hardcopy media.

6. The method of claim 5 wherein the predetermined criterion is satisfied if a number of recognized alphanumeric characters is greater than or equal to a predetermined threshold.

7. The method of claim 5 further including:
comparing groups of recognized alphanumeric characters to a dictionary of known words to identify recognized words;
wherein the predetermined criterion compares the number of recognized words to a predetermined threshold.

8. The method of claim 5 further including:
analyzing groups of recognized alphanumeric characters to determine corresponding word stems;
wherein the predetermined criterion determines whether to classify the scanned piece of hardcopy media as a document responsive to the determined word stems.

9. The method of claim 8 wherein the determined word stems are compared to a dictionary of common document word stems.

10. The method of claim 9 wherein the dictionary of common document word stems is specific to a particular document type.

11. The method of claim 1 further including analyzing the scanned digital image to determine whether the piece of hardcopy media is a blank page.

12. The method of claim 11 further including discarding any scanned digital images that are determined to be blank pages.

13. The method of claim 1 wherein both a front side and a back side of the piece of hardcopy media are scanned using the digital scanner to provide a front side digital image and a back side digital image, and wherein both the front side digital image and the back side digital image are analyzed to determine the classification.

14. The method of claim 1 wherein the document classification includes text documents, line art documents or graphics documents.

15. The method of claim 1 further including storing the scanned digital image in a digital file, and wherein the determined classification is stored as metadata associated with the digital file.

16. A system comprising:
a digital image capture device;
a data processing system;
a database memory storing a common photo sizes database specifying common physical sizes for photographs and a common document sizes database specifying common physical sizes for documents; and
a memory system communicatively connected to the data processing system and storing instructions configured to cause the data processing system to implement a method for automatically classifying scanned hardcopy media, wherein the method includes:
scanning a piece of hardcopy media using the digital image capture device to provide a scanned digital image having a plurality of image pixels having pixel values;
determining a physical size of the piece of hardcopy media;
classifying the scanned piece of hardcopy media as a photograph if the determined physical size matches one of the common physical sizes for photographs to within a predetermined tolerance;
classifying the scanned piece of hardcopy media as a document if the determined physical size matches one of the common physical sizes for documents to within a predetermined tolerance;
wherein if the determined physical size does not match any of the common physical sizes for photographs or any of the common physical sizes for documents to within a predetermined tolerance, further cause the system to perform:
analyzing the scanned digital image using a data processor to detect the presence of any alphanumeric characters present in the piece of hardcopy media;
classifying the scanned piece of hardcopy media as a document if the detected alphanumeric characters satisfy a predefined criterion; and
storing an indication of the determined classification in a processor-accessible memory.

* * * * *